(12) United States Patent
Capuani et al.

(10) Patent No.: US 9,975,072 B2
(45) Date of Patent: May 22, 2018

(54) FLEXIBLE FILTER ELEMENT WITH A PLASTIC FRAME FORMED THEREON BY INJECTION MOLDING

(71) Applicant: Carl Freudenberg KG, Weinheim (DE)

(72) Inventors: Peter Capuani, Waldmichelbach (DE); Thomas Stoesser, Viernheim (DE); Tomas Starec, Snina (SK)

(73) Assignee: Carl Freudenberg KG, Weinheim (DE)

( * ) Notice: Subject to any disclaimer, the term of this patent is extended or adjusted under 35 U.S.C. 154(b) by 128 days.

(21) Appl. No.: 15/079,108

(22) Filed: Mar. 24, 2016

(65) Prior Publication Data

US 2016/0279546 A1 Sep. 29, 2016

(30) Foreign Application Priority Data

Mar. 26, 2015 (EP) ...................... 15161059

(51) Int. Cl.
*B01D 35/30* (2006.01)
*B01D 46/00* (2006.01)
*B01D 46/10* (2006.01)
*B01D 46/52* (2006.01)
*B01D 29/00* (2006.01)
*B01D 29/07* (2006.01)
*B01D 29/01* (2006.01)

(52) U.S. Cl.
CPC ......... *B01D 35/30* (2013.01); *B01D 29/0093* (2013.01); *B01D 29/012* (2013.01); *B01D 29/07* (2013.01); *B01D 35/308* (2013.01); *B01D 46/0006* (2013.01); *B01D 46/10* (2013.01); *B01D 46/521* (2013.01); *B01D 2275/203* (2013.01)

(58) Field of Classification Search
None
See application file for complete search history.

(56) References Cited

U.S. PATENT DOCUMENTS

| RE37,150 E | * | 5/2001 | Anonychuk | ....... B01D 46/0005 454/158 |
| 2004/0116583 A1 | * | 6/2004 | Okada | ..................... C08L 25/06 524/474 |
| 2009/0301046 A1 | | 12/2009 | Felber et al. | |

FOREIGN PATENT DOCUMENTS

| DE | 4327368 A1 | * | 2/1995 | ......... B01D 46/0005 |
| DE | 4327368 A1 | | 2/1995 | |
| DE | 102008058237 A1 | | 6/2009 | |
| DE | 102007063252 A1 | | 7/2009 | |
| DE | 102010053744 A1 | | 6/2012 | |
| EP | 2133550 A2 | | 12/2009 | |

(Continued)

*Primary Examiner* — Chester T Barry
(74) *Attorney, Agent, or Firm* — Leydig, Voit & Mayer, Ltd.

(57) ABSTRACT

A filter element to be inserted into a filter housing, has a filter medium with a rim, wherein the rim is connected to an injection-molded frame or at least one injection-molded frame element, providing a flexibly bendable filter element using a frame made of plastic attached by injection molding, wherein the frame or at least one frame element is made of plastics of different hardnesses in alternation in at least one extension direction, such that the filter element can be bent flexibly at least in part by deforming the filter medium and the frame or frame element.

15 Claims, 4 Drawing Sheets

(56) References Cited

FOREIGN PATENT DOCUMENTS

| | | |
|---|---|---|
| KR | 100720763 B1 | 5/2007 |
| WO | WO 0213947 A1 | 2/2002 |

\* cited by examiner

FLEXIBLE FILTER ELEMENT WITH A PLASTIC FRAME FORMED THEREON BY INJECTION MOLDING

CROSS-REFERENCE TO RELATED APPLICATIONS

Priority is claimed to European Patent Application No. 15 161 059.9, filed on Mar. 26, 2015, the entire disclosure of which is hereby incorporated by reference herein.

FIELD

The invention relates to a filter element according to the preamble of Claim 1.

BACKGROUND

EP 2 133 550 A2 discloses a filter element with a circumferential seal, the seal consisting of two components made of plastics. However, the seal is rigid or brittle such that defined flexible bending of the filter element is not possible.

In particular, there is known a filter element in which soft frame components are obtained using two-component polyurethane systems. These frame components possess an integrated sealing function with respect to housings into which the filter element is to be integrated. However, the bending properties of this filter element are constant over the circumference of the latter.

However, in order to insert a filter element into a filter housing, it is frequently necessary to bend it in a defined manner.

Against this background, there are known filter elements with folded filter media, whose frame structure consists of a non-woven material adhesively bonded thereto. Here, different bending properties can be set by using non-woven materials of different stiffnesses. In the case of filter elements which are framed with non-woven material, the bendability requirements are met by bonding rigid or soft non-woven materials to the filter medium.

Although there are already known filter elements whose fold edges are hemmed with frames made of non-woven materials, there is still a need for more cost-effectively producible filter elements with frames of plastic injected thereon.

Filter elements which are provided with a frame produced by injection molding must also have the above-mentioned bending properties at certain locations in order to avoid problems when installing or pushing these elements into the housing.

This requirement forms the basis of increasing demands on the flexibility of filter elements. A sufficiently flexibly bendable filter element is easy to build in and can be inserted in relatively few steps for example into the shaft of an air conditioning system.

Against this background, there are indeed already known filter elements which have folded filter media and are provided with an injection-molded frame. There exist embodiments whose frame is formed over the entire circumference. There also exist embodiments in which the frame is provided with an additional seal made of a soft plastic which is injected onto a rigid frame. This provides a seal for the filter element in a housing.

DE 10 2007 063 252 A1 discloses filter elements with frames which can be produced by injection molding. These filter elements have folded filter media which are provided with a frame. The frame has gaps between the fold edges. This is shown in FIG. 1, which is taken from DE 10 2007 063 252 A1.

The frame has, in the region of the gaps, thin points which, when loaded, act as a hinge, in particular as a film hinge. The filter element can be bent about the axes between the opposing thin points.

The opposing thin points have the drawback that, due to the integration of the filter medium, they are not very well suited to acting as a hinge and namely often break when loaded. This leads to leaks in the filter element-housing system. Moreover, filter elements having frames with gaps are difficult to seal.

The use of film hinges is specifically known from DE 10 2007 063 252 A1. However, the technical challenge for a film hinge is to achieve a thin point with a material thickness of just a few tenths of a millimeter.

In general, the material thickness is 0.3 to 0.35 mm. Since a filter medium, in the case of an injection-molded filter element, is enclosed by a frame made of a plastic, the technical demands for a film hinge can be achieved only with difficulty. Namely, the material thickness is usually exceeded during creation of the frame.

In the case of a filter element for filtering particles, the resulting material thickness of the film hinge would be 0.6 to 0.7 mm. This would impair the bendability and flexibility of the film hinge as well as its service life. This would lead to material breakage, resulting in the filter element leaking in the housing.

In the case of a combined filter element, a film hinge cannot be created since the material thickness is approximately 1.5 mm and fluctuates.

For many applications, however, the filter elements must be able to bend at certain locations in order that they can be installed in a housing. Only by having a certain bendability can the filter elements be introduced into a respective installation opening of a housing. At other locations, however, the frame of a filter element must be sufficiently hard to ensure a required strength of the filter element in operation.

SUMMARY

An aspect of the invention provides a filter element to be inserted into a filter housing, the element comprising: a filter medium including a rim, wherein the rim is connected to an injection-molded frame or at least one injection-molded frame element, wherein the frame or at least one frame element includes plastics of different hardnesses in alternation in at least one extension direction, such that the filter element can be bent flexibly at least in part by deforming the filter medium and the frame or frame element.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
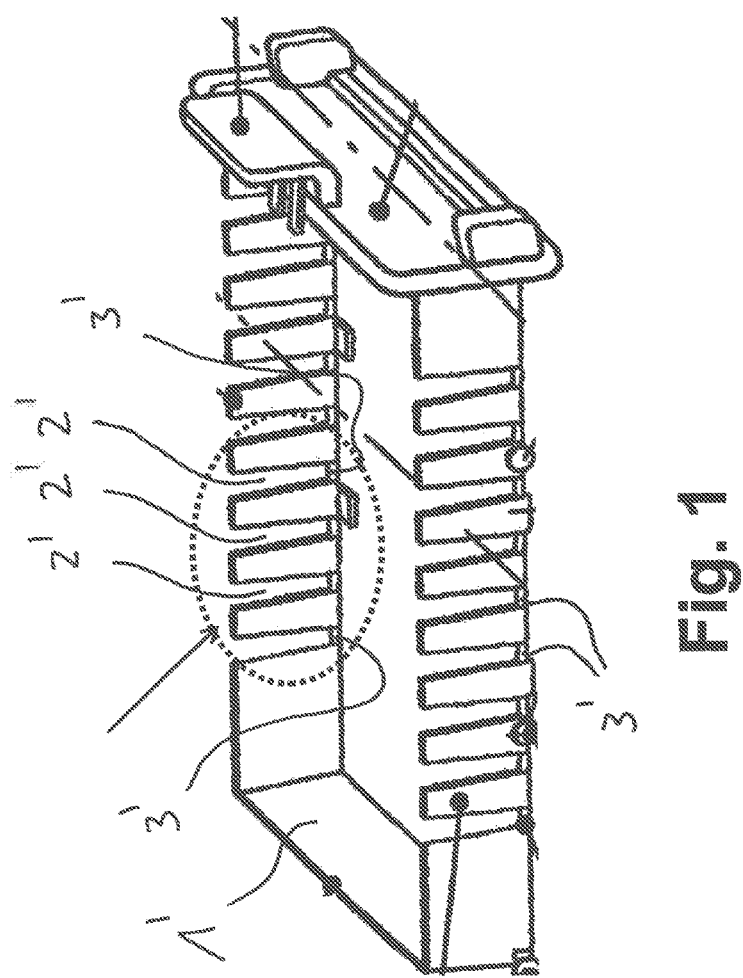
FIG. 1 shows a frame element of the prior art which has gaps and thin points.

An aspect of the invention is based on providing a flexibly bendable filter element which is provided with a frame made of plastic affixed by injection molding.

A filter element to be inserted into a filter housing, according to an aspect of the invention, comprises a filter medium with a rim, wherein the rim is connected to an injection-molded frame or at least one injection-molded frame element.

The frame or at least one frame element is made of plastics of different hardnesses in alternation in at least one direction of extent, such that the filter element can be bent flexibly at least in part by deforming the filter medium and the frame or frame element. The filter element is therefore able to be introduced into a filter housing and therein to once again adopt its shape prior to deformation. The filter element is non-destructively deformable.

According to a aspect of the invention, it is first noted that filter elements can be made in injection-molding tools. The injection-molding tools permit the execution of a two-stage injection-molding process in which various plastics, in particular thermoplastics, elastomers or thermoplastic elastomers, are used.

It is further noted that a softer plastic permits good integration of the used filter medium in this plastic.

It is also noted that a frame or frame element has a soft frame region which, when a suitable plastic is chosen, can perform a sealing function. The sealing function is then integrated into the frame element. The filter element can be produced in a single fully automated injection-molding process without further post-processing steps.

After production, the filter element has all of the required properties. Post-processing steps such as adhesively bonding a seal thereon can be omitted. The filter element according to the invention can adopt a great many bending radii if the hardness of the plastics is set accordingly. Softer frame regions of a frame or frame element produce, in a defined manner, locations at which the frame or the frame element can kink or bend slightly together with the filter medium.

An object of an aspect of the invention is thus achieved.

A frame region made of softer plastic could adjoin one or more frame regions of the frame or frame element made of harder plastic, wherein the frame region made of softer plastic forms a designated bending location. The formation of a designated bending location allows the filter element to bend in a defined manner, such that it can be inserted while bent into a housing, in particular into a filter housing.

The plastics of different hardnesses could take the form of elastomers, thermoplastic elastomers and/or thermoplastics. Elastomers and in particular thermoplastic elastomers are particularly well-suited as hinge materials for the production of filter elements. Conventionally, a thermoplastic elastomer is used as seal material in a two-component injection-molding process. The advantages of the injection-molding process are allied with the advantages of a flexible filter element. Injection-molding processes are well-suited to the production of complex geometries.

At the designated bending locations at which it is made to be bendable, the frame or the frame element could therefore have as plastic a thermoplastic elastomer. Advantageously, at those locations at which it is to be designed to be bendable, the frame or the frame element is made of a thermoplastic elastomer using a two-component injection-molding process. This elastomer entirely fills the spaces between fold edges when using a bellows, and namely binds the fold edges just as reliably as hard polymers. The filter element is flexible at defined locations.

The flexibility can be set by setting the number of spaces filled with thermoplastic elastomer, and by choosing the hardness of the material used. Parallelism and spacing of the folds remains essentially constant even in the curved state of the filter element.

The plastics of different hardnesses could be mutually interlocked or connected in a material-bonded manner. The phase transitions between the various plastics can be effected by interlocking. This permits good adhesion between the different plastics and with the filter media used. Two-phase injection molding is advantageously broadened for filter elements in that it is possible to form toothed framing parts with different plastics.

Against this background, the filter element described here could be produced using a two-component injection-molding process. It is not simply a case of a second, softer plastic being injected circumferentially as hitherto onto a first, harder plastic, as is already known from the prior art. In spite of the injection-molding production, the filter element is no more costly than an edge-glued filter element in which use is made of non-woven materials.

A sealing lip could be arranged on the frame or on at least one frame element. It is thus possible to seal the filter element against a housing wall.

The filter medium could comprise a bellows with fold tips and fold edges, wherein the frame or at least one frame element is connected at least in certain sections to the fold edges. A bellows makes a particularly large filter surface available in a tight space.

The bellows could have activated carbon or other adsorbent materials. Thus, the filter element is configured as a combined filter element which not only filters dust particles but also physically binds materials.

The filter element described here represents an improvement in particular for particle filter elements. Furthermore, it is possible to make injection-molded combined filter elements flexible and bendable. The flexibility and bendability achieved could not be produced with a film hinge.

Against this background, it is also conceivable to design a rectangular filter element such that a rigid single-component plastic is molded onto two sides of the bellows of the filter element and a soft single-component plastic is molded onto two sides of the bellows of the filter element.

The filter element described here can also have a non-rectangular geometry. It can thus be inserted into a housing of corresponding shape.

The filter element described here can be used in motor vehicles or in air conditioning systems.

FIG. 1 shows a frame element 1' of the prior art which has gaps 2' and thin points 3'.

Figure 2:
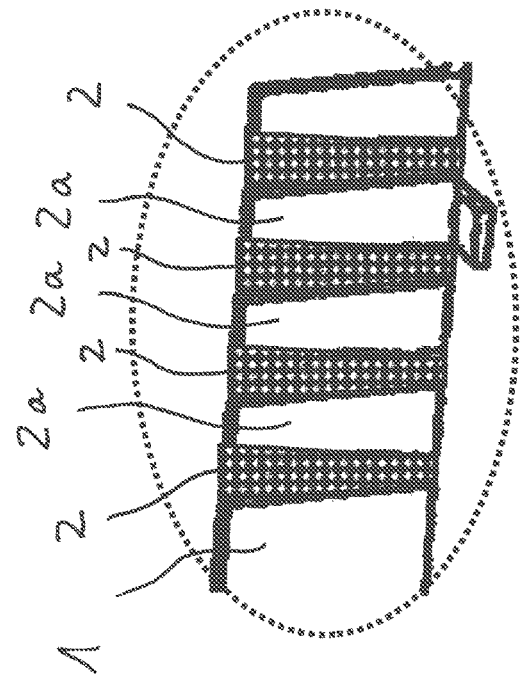
FIG. 2 shows a frame element in which some frame regions are made of a harder plastic and some frame regions are made of a softer plastic.

FIG. 2 shows a frame element 1 in which some frame regions 2a are made of a harder plastic and some frame regions 2 are made of a softer plastic.

Figure 3:
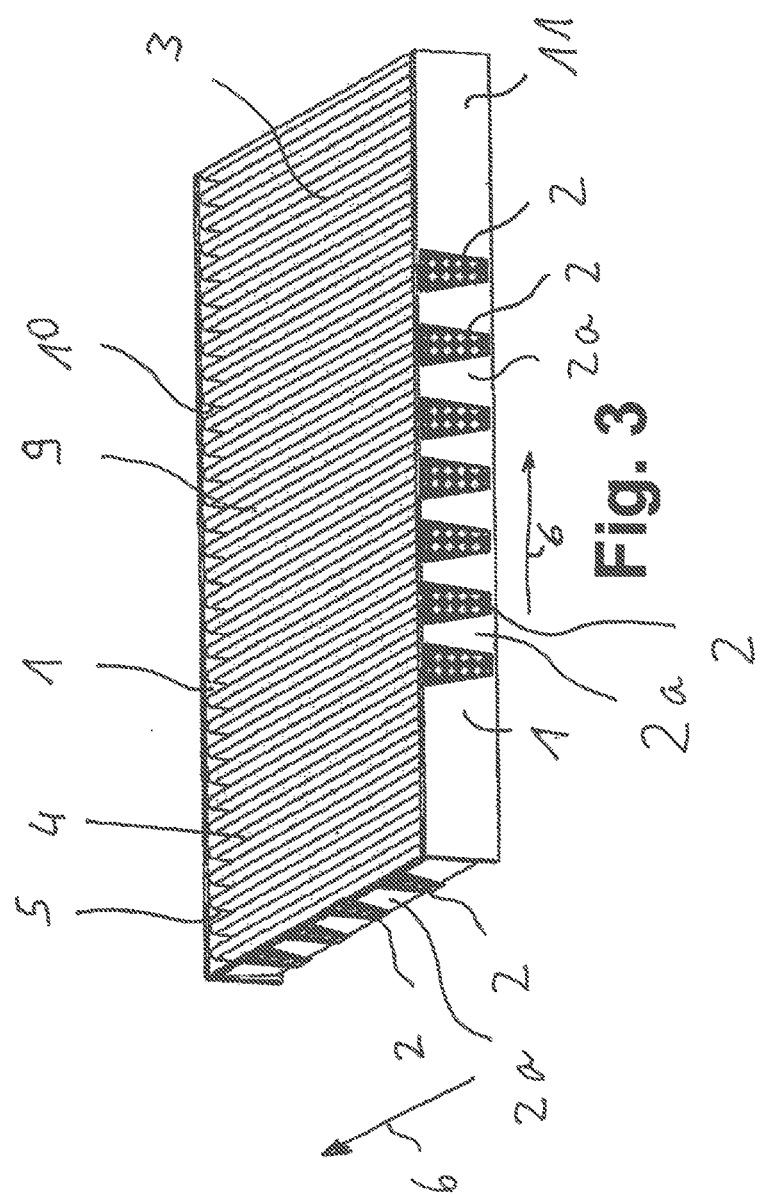
FIG. 3 shows a filter element having the frame element as shown in FIG. 2

FIG. 3 shows a filter element to be inserted into a filter housing, comprising a filter medium 9 with a rim 10, wherein the rim 10 is connected to at least one injection-molded frame element 1.

The frame element 1 is made of plastics of different hardnesses in alternation in at least one direction of extent 6, such that the filter element can be bent flexibly at least in part by deforming the filter medium 9 and the frame element 1.

A frame region 2 made of softer plastic adjoins one or more frame regions 2a of the frame element 1 made of harder plastic, wherein the frame region 2 made of softer plastic forms a designated bending location.

The plastics of different hardnesses could take the form of elastomers, thermoplastic elastomers or thermoplastics. At the designated bending locations at which it is made to be bendable, the frame element 1 could have as plastic a thermoplastic elastomer.

The plastics of different hardnesses are connected to one another in a material-bonded manner.

The filter element is produced in a two-component injection-molding process.

The filter medium 9 comprises a bellows 3 with fold tips 4 and fold edges 5, wherein at least one frame element 1 is connected at least in certain sections to the fold edges 5.

Specifically, four frame elements 1 surround the rectangular bellows 3 on all four sides. Here, the frame elements 1 are formed circumferentially and intrinsically closed as one frame 11. Each frame element 1 is constructed of plastics of different hardnesses in alternation in at least one direction of extent 6, such that the frame element 1 is flexibly bendable in the line of and/or transversely to its extent. Frame regions 2, 2a made of plastics of different hardnesses alternate in a direction of extent 6.

Figure 4:
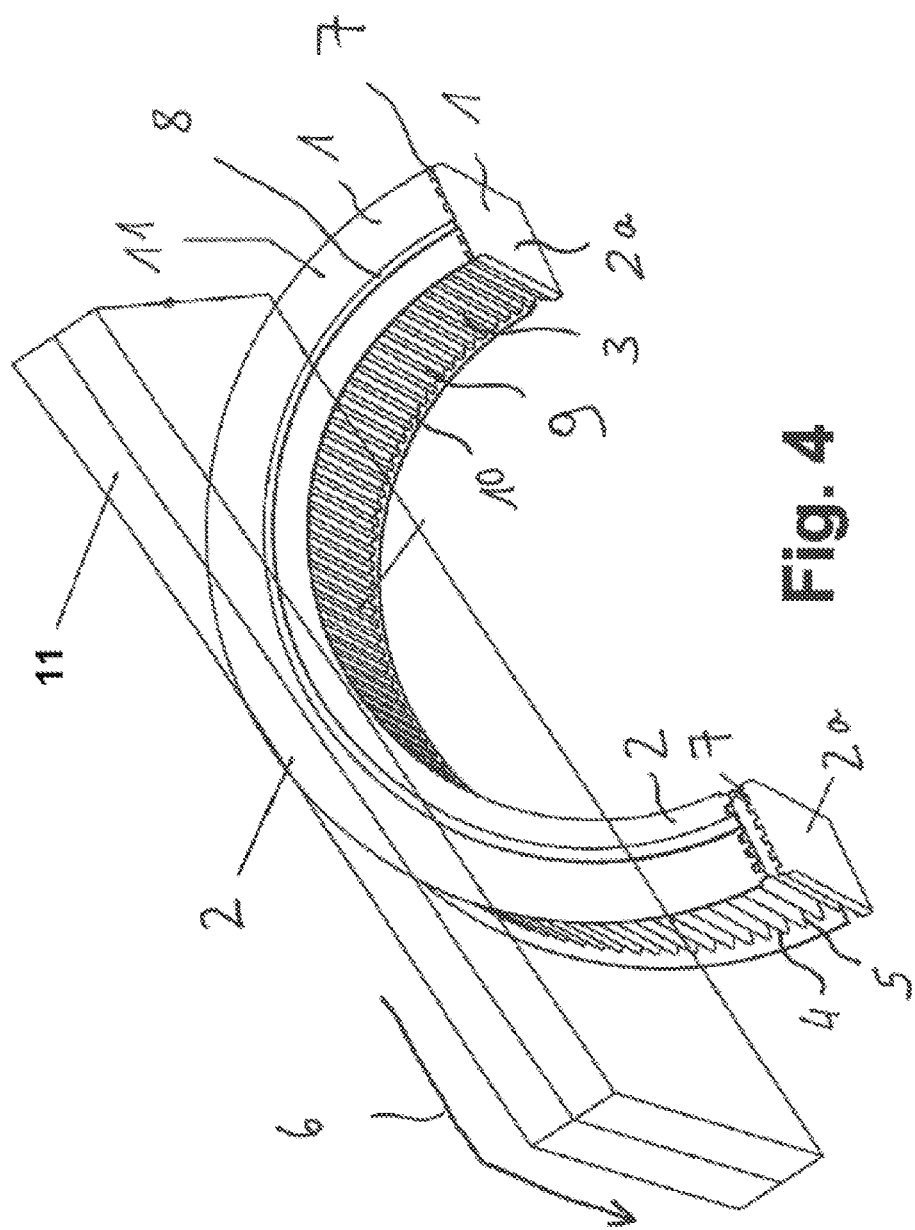
FIG. 4 shows a filter element in which two opposing frame regions of a frame are respectively formed as rigid and flexible frame regions, in the curved state and in the non-curved state.

FIG. 4 shows a filter element to be inserted into a filter housing, comprising a filter medium 9 with a rim 10, wherein the rim 10 is connected to an injection-molded frame 11 or at least one injection-molded frame element 1. In this case, the frame elements 1 are in the form of frame regions 2, 2a.

The frame 11 is made of plastics of different hardnesses in alternation in at least one direction of extent 6, namely in the circumferential direction, such that the filter element can be bent flexibly at least in part by deforming the filter medium 9 and the frame 11.

A frame region 2 made of softer plastic adjoins a frame region 2a of the frame 11 made of harder plastic, wherein the frame region 2 made of softer plastic forms a designated bending location.

The plastics of different hardnesses take the form of thermoplastic elastomers and thermoplastics. The frame regions 2a are made of a thermoplastic. The frame regions 2 are made of a flexible thermoplastic elastomer.

In this respect, at the designated bending locations at which it is designed to bend, the frame 11 has as plastic a thermoplastic elastomer.

The above-mentioned plastics of different hardnesses are mutually interlocked in a material-bonded manner.

The filter element is produced in a two-component injection-molding process.

A sealing lip 8 is arranged on the frame 11.

The filter medium 9 comprises a bellows 3 with fold tips 4 and fold edges 5, wherein the frame 11 is connected at least in certain sections to the fold edges 5.

Specifically, FIG. 4 shows a filter element to be inserted into a filter housing, comprising a bellows 3 with fold tips 4 and fold edges 5, wherein two longer frame regions 2 bear at least in certain sections against the fold edges 5 and are securely connected thereto. Two shorter frame regions 2a are also securely connected to the bellows 3.

The longer frame regions 2 are flexible and are made of a first plastic. The shorter frame regions 2a are rigid and are made of a different, second plastic.

The different plastics are securely connected to one another, preferably by means of a sawtooth connecting seam 7.

In this exemplary embodiment as shown in FIG. 4, the flexible frame region 2 has a sealing lip 8 made of the same flexible plastic of which the frame region 2 itself is made.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A. B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A filter element to be inserted into a filter housing, the element comprising:
 a filter medium including a rim; and
 an injection-molded frame arranged so as to surround the filter medium,
 wherein the rim of the filter medium is connected to the frame or at least one injection-molded frame element of the frame, and
 wherein the frame includes plastics of different hardnesses in at least one extension direction, including a first frame region comprised of a softer plastic adjoining a second frame region comprised of a harder plastic adjoining a third frame region comprised of the softer plastic, such that the filter element is configured to be bent flexibly at least in part by deforming the filter medium and the frame.

2. The element of claim 1, wherein the plastics of different hardnesses include elastomers, thermoplastic elastomers, and/or thermoplastics.

3. The element of claim 1, wherein the plastics of different hardnesses include elastomers.

4. The element of claim 1, wherein the plastics of different hardnesses include thermoplastic elastomers.

5. The element of claim 1, wherein the plastics of different hardnesses include thermoplastics.

6. The element of claim 1, wherein, at designated bending locations which are bendable, the frame or the at least one frame element includes a thermoplastic elastomer.

7. The element of claim 1, wherein the plastics of different hardnesses are mutually interlocked.

8. The element of claim 1, wherein the plastics of different hardnesses are connected in a material-bonded manner.

9. The element of claim 1, produced in a process including two-component injection-molding.

10. The element of claim 1, further comprising:
a sealing lip, arranged on the frame or on the at least one frame element.

11. The element of claim 1, wherein the filter medium includes a bellows including fold tips and fold edges,
wherein the frame or the at least one frame element is at least partially connected to the fold edges.

12. The element of claim 11, wherein the bellows include activated carbon or other adsorbent materials.

13. The element of claim 1, wherein the rim is connected to the frame.

14. The element of claim 1, wherein the rim is connected to the at least one frame element.

15. A filter element to be inserted into a filter housing, the element comprising:
a filter medium including a rim,
wherein the rim is connected to an injection-molded frame or at least one injection-molded frame element,
wherein the frame or at least one frame element includes plastics of different hardnesses in alternation in at least one extension direction, such that the filter element can be bent flexibly at least in part by deforming the filter medium and the frame or frame element, and
wherein the plastics of different hardnesses are connected in a material-bonded manner.

* * * * *